June 17, 1969  L. A. HOPKINS ET AL  3,450,450
PRESSURE RESISTING SEAL
Filed March 3, 1967
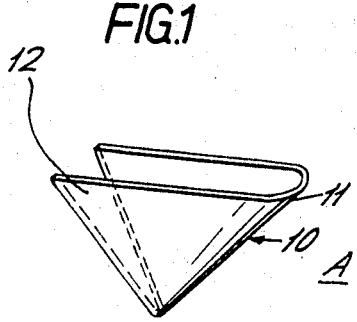
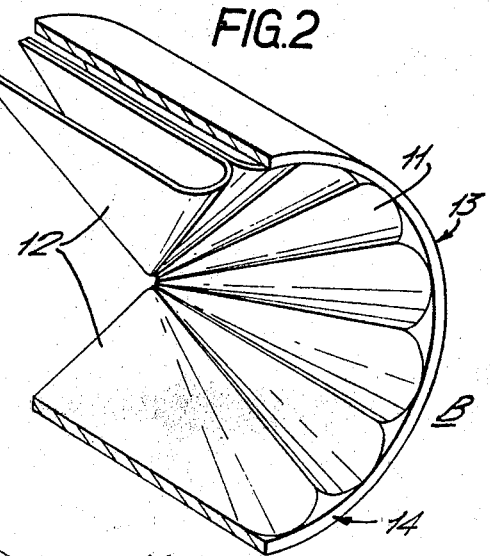
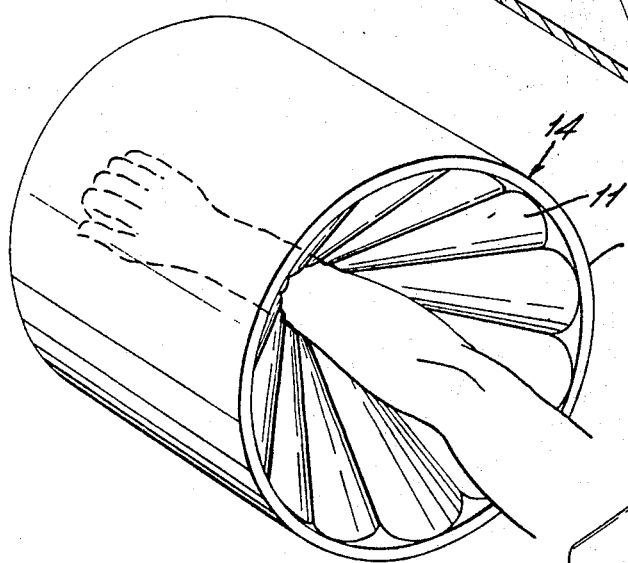
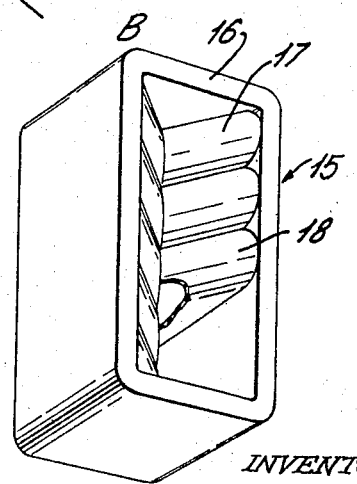
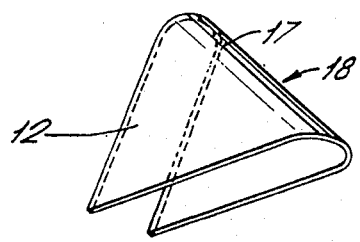
INVENTORS
L. A. HOPKINS
B. L. HARRIS
BY
Cameron, Kerkam & Sutton
ATTORNEYS

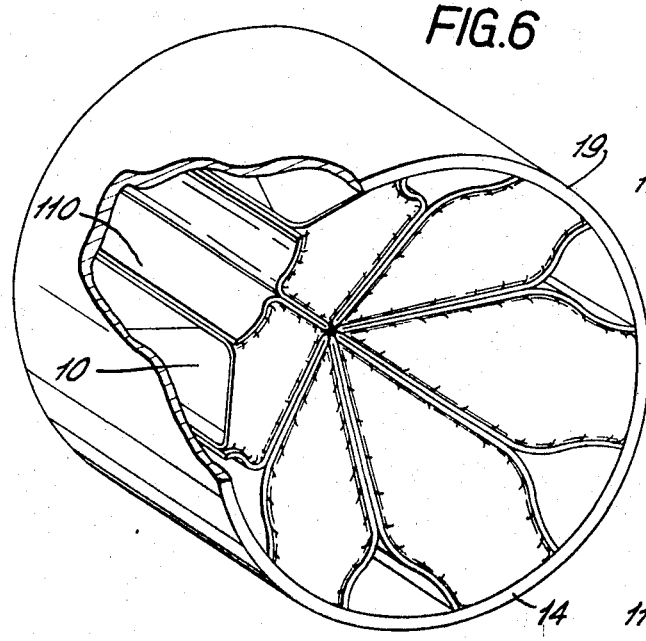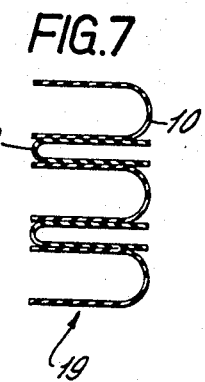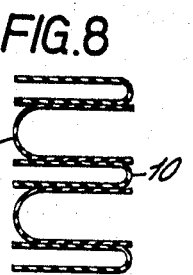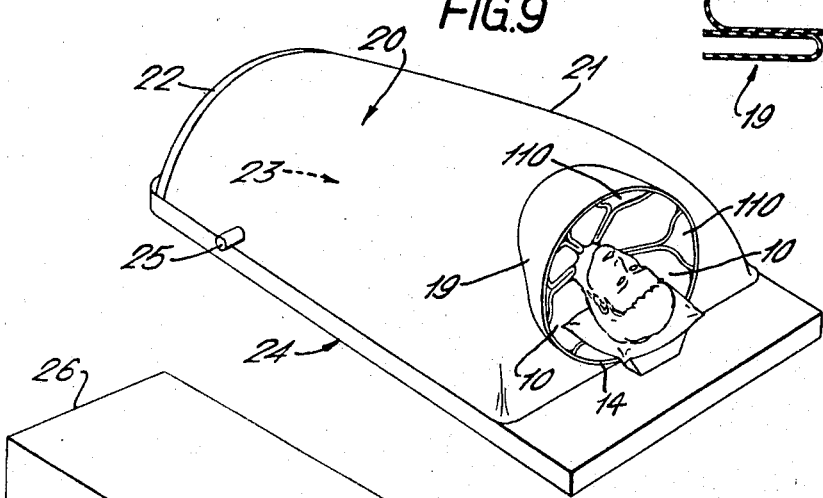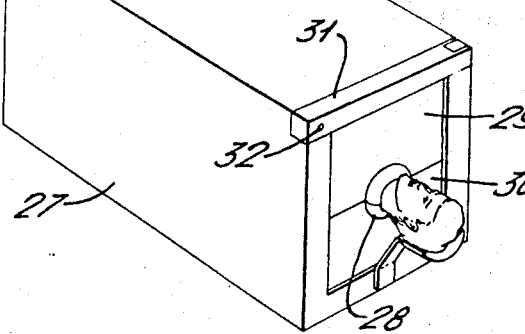

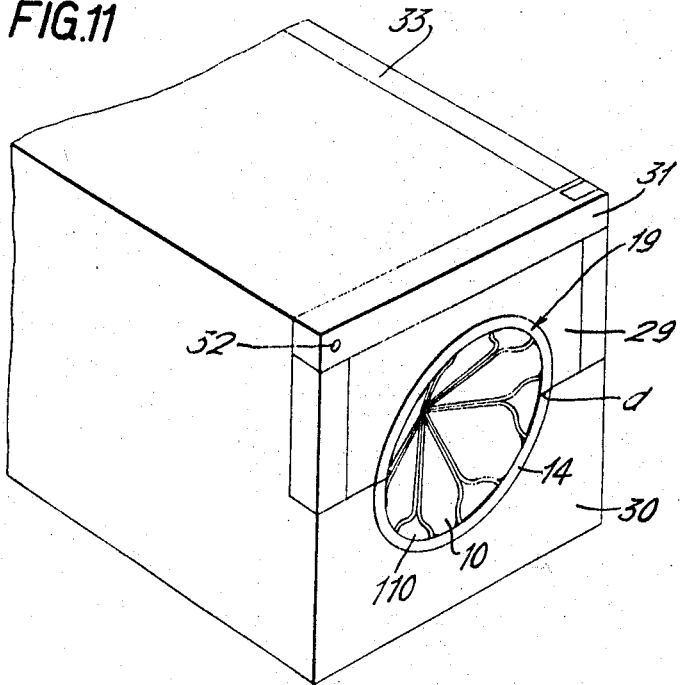
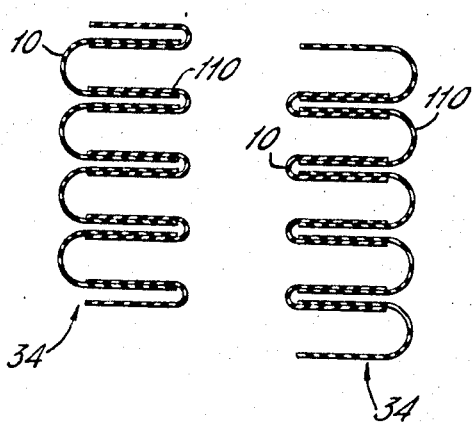
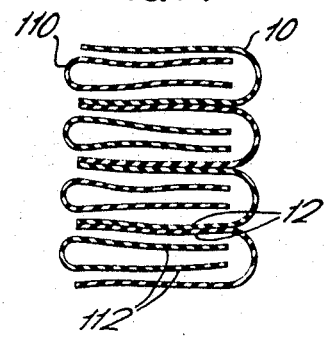
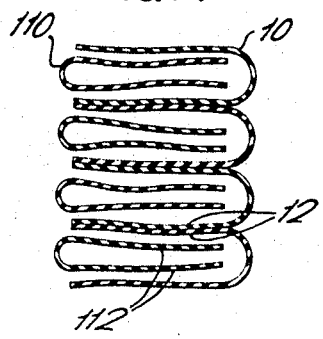
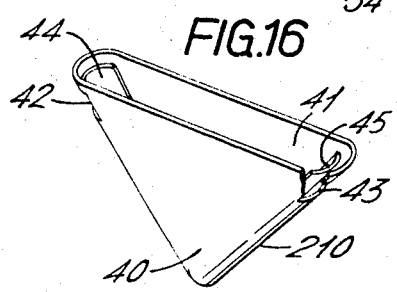

June 17, 1969 L. A. HOPKINS ET AL 3,450,450
PRESSURE RESISTING SEAL
Filed March 3, 1967 Sheet 4 of 4

INVENTORS
L. A. HOPKINS
B. L. HARRIS
BY
Cameron, Kerkam & Sutton
ATTORNEYS

United States Patent Office 3,450,450
Patented June 17, 1969

3,450,450
PRESSURE RESISTING SEAL
Leslie Arthur Hopkins and Benjamin Lewis Harris, Southampton, England, assignors to National Research Development Corporation, London, England, a corporation of Great Britain
Filed Mar. 3, 1967, Ser. No. 620,401
Claims priority, application Great Britain, Mar. 11, 1966, 10,790/66
Int. Cl. A61g 11/00; B65d 39/00, 51/00
U.S. Cl. 312—1                                    19 Claims

ABSTRACT OF THE DISCLOSURE

A pressure resistant seal comprises means defining an aperture and a plurality of closure members of flexible sheet material, such as rubberised fabric, attached side-by-side to the periphery of the aperture in such a fashion that a pressure difference applied across the seal causes the closure members to take up positions extending across the aperture, thereby to close the aperture, at least partly. Arrangements are disclosed for resisting pressure differences acting alternately in opposite directions across the seal. Since the closure members are of flexible sheet material, objects may be passed through the seal without substantially increasing any leakage therethrough. The seals are accordingly useful, for example, in isolating the atmosphere in glove-boxes or for use as neck-seals in iron-lung type respirators.

---

Figure 15:
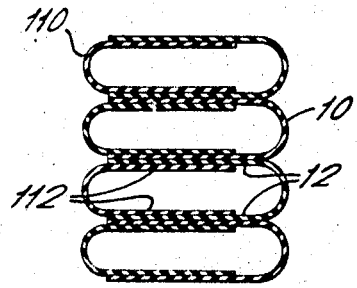

The present invention relates to a pressure resisting seal.

Pressure resisting seals are found in many applications, among which may be briefly mentioned the pressure chambers for isolating biological or radioactive specimens and the seals which co-operate with the necks of persons whose torsos are confined in so-called "iron lung" respirators. These latter seals must be able to resist pressure differences of the order of ten inches w.g. to twenty-five inches w.g. The known seals for resisting these pressure differences fit fairly tightly around the necks of the patients, causing some discomfort, and more or less immobilising the patients for months at a time.

On the whole, none of these known seals enables access to be obtained from the low pressure side to the high pressure side of the seal or vice-versa without substantially increasing the leakage across the seal.

It is an object of the present invention to provide an improved pressure resisting seal.

According to one aspect of the present invention, there is provided a pressure resisting seal comprising means defining an aperture, and a plurality of flexible sheet closure members attached side-by-side around the periphery of the aperture, each of which, under the influence of pressurised fluid confined on one side of the seal, during use, co-operates with and substantially seals against peripherally adjacent closure members and extends towards flexible closure members extending from an opposite portion of the periphery of the aperture, whereby to close the aperture, at least partly.

Since the closure members are flexible, they will be deflected when an object is passed through the seal, and will cooperate with, and seal against, the object. Any leakage of pressurised gas through the seal before the passage of the object should not be substantially increased while the object is passing through the seal.

Each of the flexible closure members may comprise a closure portion which, in operation, extends across the aperture under the influence of the pressurised fluid, and means for restraining the closure portion against the pressure of the fluid, whereby the closure portions forms a boundary for the fluid.

The restraining means may comprise a pair of flexible sheet cheek portions which connect the periphery of the aperture and those opposite edge regions of the closure portion which extend inwardly from the periphery of the aperture during operation, the adjacent cheek portions of neighbouring closure members being inflated into substantial sealing cooperation with each other, in operation, under the influence of the pressurised fluid.

Each cheek portion may be of substantially isosceles right-angled triangular form and may be arranged with its hypotenuse contiguous to the periphery of the aperture, and with one of its other two edge regions connected to one of the said edge regions of the closure portion whereby, in operation, the closure portion is maintained at an angle of substantially 45° to the plane of the aperture against the influence of the pressurised fluid.

Each closure portion and the associated pair of cheek portions may be formed from a common piece of flexible sheet material, such as proofed nylon or rubber sheet.

The aperture may be substantially circular, and each closure portion may be substantially triangular in shape: if the closure portions are of suitable dimensions, the innermost tips of the closure members will all meet and cooperate at the centre of the aperture so as substantially to close the aperture. Alternatively, the closure portions may be substantially trapezium shaped or frusto-triangular, and in cases where the aperture is circular the dimensions of the closure portions may be so chosen that a circular gap is defined between the innermost tips of the closure portions. This is useful in that when an object is passed through the seal, the degree of crumpling of the closure members is reduced in regions where the closure members cooperate with, and seal against, the object.

Where the pressure resisting seal in accordance with the invention is to be subject to pressure differences which act first in one direction across the seal and then in the other direction across the seal, there may be two sets of flexible closure members, each set serving to resist the pressure difference acting in one of the two directions. Conveniently the flexible closure members in each set may be identical but oppositely facing, and each of the flexible closure members in one set may be integral or non-integral with a flexible closure member of the other set.

The flexible closure members may each have a tapering channel-like shape, being substantially in the form of a U in cross-section normal to the plane of the aperture and tapering away from the periphery of the aperture.

The invention also includes a pressure-tight enclosure for wholly or partly enclosing objects and having a pressure resisting seal as described above for substantially isolating fluid inside the enclosure from fluid outside the enclosure.

Figure 17:
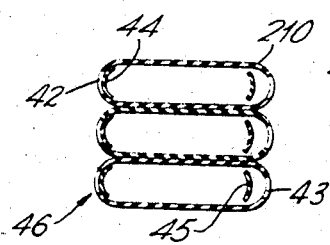
Figure 18:
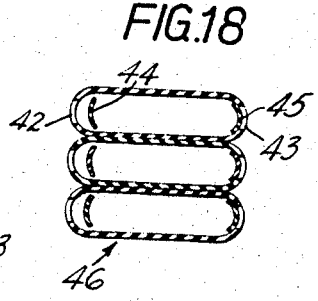
Figure 20:
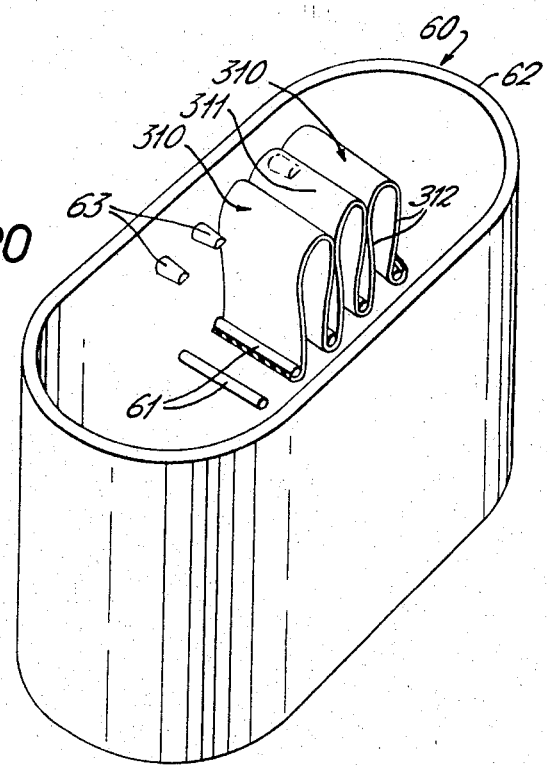
Figure 19:
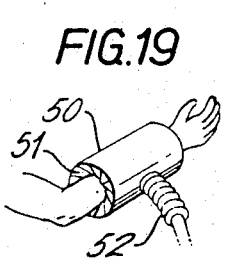

The invention will now be described by way of example only, with reference to the accompanying drawings, in which:

FIGURE 1 shows one form of flexible closure member for use in a seal in accordance with the invention, FIGURE 2 depicts, in part-cross-section, one form of pressure resisting seal in accordance with the invention, FIGURE 3 shows the seal of FIGURE 2 in use, FIGURE 4 shows, in part-cross-section, another form of seal in accordance with the invention, FIGURE 5 depicts a flexible closure member for use in the seal of FIGURE 4, FIGURE 6 shows, in part-cross-section, a seal in accordance with the invention which is capable of resisting pressures acting alternately in opposite directions, FIGURE 7 is a developed view of the seal of FIGURE 6, FIGURE 8 is another developed view of the seal of FIGURE 6, FIGURE 9 illustrates a respirator incorporating a seal in accordance with the invention, FIGURE 10 shows a respirator of known type, FIGURE 11 depicts a respirator in accordance with the invention which has been adapted from the respirator of FIGURE 10, FIGURE 12 shows a developed view of another form of seal in accordance with the invention, FIGURE 13 shows in a developed view, another configuration of the seal of FIGURE 12, FIGURES 14 and 15 depict developed views of two configurations of yet a further form of seal in accordance with the invention, FIGURE 16 illustrates another form of closure member for use in seals according to the invention, FIGURES 17 and 18 illustrate the manner of operation of the closure member of FIGURE 16, FIGURE 19 illustrates a sleeve having a seal in accordance with the invention, and FIGURE 20 shows, in a perspective view, yet a further form of seal in accordance with the invention, with parts removed to show the manner of construction.

In the drawings, an item which appears in more than one figure will be given the same reference numeral in each figure.

Referring first to FIGURE 1, the flexible closure member 10 for use in a seal in accordance with the invention is formed from a substantially right-angled triangular piece of rubberised fabric which has been folded about the medial line through the right-angle to a channel-like shape to provide a substantially triangular closure portion 11 and restraining ties 12 in the form of substantially right-angled triangular cheek-portions or webs on each of the opposite edges of the closure portion 11 and extending substantially normally thereto.

FIGURE 2 depicts a seal 13 in accordance with the invention, incorporating a number of the flexible closure members 10 of FIGURE 1. The closure members 10 are fastened e.g., by adhesive, around the inner periphery of an aperture defined by a ring 14, by the edges that were originally opposite the right-angle, so that all of the restraining ties 12 extend towards letter A in FIGURE 2 and the closure portions are presented towards letter B. Each tie 12 has angles of about 45° adjacent the edge fastened to the ring 14 and the angle most remote from the fastened sides is about 90°. When the pressures on each side of the seal 13 are equal, the closure members 10 take up positions determined by their weight and stiffness. However, when the pressure on the side of letter A exceeds the pressure on the side of letter B, the closure members 10 are, in effect, inflated, and peripherally adjacent restraining ties 12 of successive closure members are urged into contact so that they sealingly cooperate, while the closure portions 11 of closure members 10 on one side of the periphery of the aperture in ring 14 extend towards the closure portions 11 of closure members 10 on the opposite side of the periphery so that they close the aperture in the ring 14. The pressure forces act on the closure portion 11 at right angles to its surface and are communicated to the ring 14 through the restraining ties 12. Since all parts of the restraining ties 12 extend substantially at right angles between the closure portion 11 and the ring 14 the pressure forces set up tension in the restraining ties 12 without substantially causing any buckling thereof. It will be appreciated that because the closure members 10 are flexible and discrete, they may be deformed and displaced relative to each other, so that an object, such as a hand, can be pushed through the seal 13 from one side to the other substantially without increasing any leakage through the seal. Furthermore, if the object (i.e. the hand) is pushed partly through the seal 13 (i.e. up to the wrist), the closure members 10 will sealingly cooperate with the object (i.e. the wrist) and thus substantially prevent the passage of fluid through the seal.

FIGURE 3 shows an arm which has been pushed through a seal 13 nearly as far as the elbow. This type of seal 13 is useful for maintaining the pressure in pressurised chambers containing specimens such as biological specimens which are to be preserved in a controlled atmosphere or medical instruments which are to be kept in the controlled environment of a sterilising cabinet, and is contemplated as a useful alternative to the glove-seal of a "glove-box" chamber.

FIGURE 4 shows another form of seal 15 in accordance with the invention. This seal 15 differs from the seal 13 in that the place of the ring 14 is taken by an apertured rectangular member 16 and the closure portions 17 of the closure members 18 are more nearly rectangular than the closure portions 11 of the seal 13.

A closure member 18 for use in the seal 15 is shown in FIGURE 5. The restraining ties 12 are substantially of right angled isosceles form as shown and described in relation to FIGURES 1 and 2 and are employed with the right angled tip directed away from the rectangular member 16.

FIGURE 6 shows the closure members of a seal 19 in accordance with the invention and which is capable of substantially preventing the passage of fluid therethrough when the differential pressure acts across the seal 19 first in one direction and then in the opposite direction. The seal 19 comprises a set of closure members 10, similar to, and arranged in the same way, as the closure members 10 of FIGURE 3, except that between a pair of adjacent closure members 10 are disposed a set of further closure members 110, of the same form as the closure members 10, but which face in the opposite direction to the closure members 10. The closure members 10, 110 are attached to the periphery of the aperture which they are to seal in the same manner as described in relation to FIGURES 1 and 2. FIGURE 7 is a developed view of the closure members 10, 110 of the seal 19. The closure members 10, 110 will take up the disposition shown when the pressure on the left of the seal 19 (as seen in FIGURES 6 and 7) exceeds the pressure to the right of the seal 19. The closure members 10 are inflated by the pressure difference and adjacent restraining ties 12 of successive closure members 10 are urged towards each other, to cooperate with and compress the closure member 110 in between so as to close any gap between the closure members. Because the peripheral edges of the closure members 10, 110 are fixed, only non-peripheral regions will function in this way, but this does not impair the functioning of the seal as a whole.

FIGURE 8 shows, in a developed view, the seal 19, when the pressure to the right of seal 19 exceeds the pressure to the left. The closure members 10 are now collapsed (except in the fixed peripheral regions) by the closure members 110 which become inflated, their restraining ties being urged into co-operation with the collapsed closure members 10 so as to close any gap between the closure members. Thus as the direction of the pressure difference across seal 19 changes, the closure members 10 and 110 will alternate their configurations between those shown in FIGURES 7 and 8. It will be appreciated that because the closure members are flexible and discrete, it will be possible to pass an object wholly or partially through seal 19, between the closure members 10, 110, in a manner similar to that described in relation to FIGURES 1 to 4 substantially without allowing the passage of fluid through the seal 19.

FIGURE 9 shows a respirator 20 of the type commonly known as an "iron-lung," and incorporating the seal 19 of FIGURES 6 to 8. The respirator 20 comprises a circumferential wall 21 which connects an end wall 22 at one end with the seal 19 at the other end, and defines therewith a chamber 23 resting on a base 24. The closure members 10, 110 of the seal 19 extend inwardly from the ring 14 and terminate outwardly of the centre of the ring 14 so as to leave a circular gap between the innermost tips of the closure members 10, 110. The closure portions 11 of the closure members 10 are substantially trapezium-shaped since the gap between the innermost tips of the closure members 10 has been formed by removing a triangular portion of the innermost tips of the closure members 10 depicted in FIGURE 1. The circumferential wall 21 may be of rigid sheet material such as aluminium sheet, or it may be of flexible sheet material such as rubberised fabric for ease of portability. In the case where the wall 21 is of flexible sheet material, it may be desirable to support the wall 21 internally by, for example, a tubular aluminium frame (not shown), to prevent the wall 21 collapsing inwardly when the pressure in the chamber 23 is reduced below atmospheric pressure. The body of the patient is arranged to be within the chamber 23 while his head is outside the chamber 23, the closure members 10, 110 cooperating and sealing with the patient's neck, which closes the circular gap between the innermost tips of the closure members 10, 110. The patient's body is received in the chamber 23 by removing the end wall 22 and pushing the patient through the chamber 23 until the head has passed through the seal 19, after which the end wall 22 is re-attached to the circumferential wall 21. The pressure in the chamber 23 is then alternately increased and decreased relative to the atmospheric pressure, by respectively pumping fluid in and out of chamber 23 through connection 25. The fluid will usually be air, although other gases, and liquids, such as water, may also be used. There is substantially no passage of fluid or atmospheric air through the seal 19. The patient's neck is surrounded by the flexible closure members 10, 110 which sealingly cooperate therewith without gripping the throat. Because the closure members are discrete and therefore relatively movable, the patient can move his neck and head (for example, he can turn from lying on his back to lying on his side) without substantially impairing the fluid-tightness of the seal 19. Preferably, the dimensions of the closure members 10, 110 are so chosen that they have a minimal axial and radial extent consistent with the requirement that they seal against the neck of the patient, so that they encumber the patient to the minimum extent. For example, the inside diameter of the ring 14 may be about 10 inches, and each of the closure members 10, 110 may extend radially inwardly about 2–4 inches from the ring 14. Since the closure portions of the closure members 10, 110 are of substantially trapezium shape, they will each extend in the axial direction a distance somewhat more than twice their radial extents. The 10 inches internal diameter of the ring 14 is sufficient to allow passage of the patient's head, while the dimensions of the closure members 10, 110 provide a relatively comfortable sealing fit around the patient's neck. Since the innermost tips of the closure members 10, 110 do not meet at the centre of the aperture, the closure members 10, 110 are crumpled less, when the patient's neck is accommodated, than would be the case were the innermost tips to meet: the patient's comfort is thus enhanced. In a modification (not shown) the respirator 20 may be provided with an outlet, so that there will be a through flow of the pressurising fluid from connection 25 across the chamber 23 to the outlet. An arrangement of this type, permitting a continuous current of the fluid through the chamber 23 and over the patient's body is brought to provide therapeutic benefits in cases where the patient's body is burned or lacerated.

In a further modification, not shown, the circumferential wall 21 may include a seal in accordance with the invention, such as the seal 19, so that access may be had to the patient's body for the purpose of giving injections or attending to the patient's toilet. It is also contemplated that the respirator 20 may be in the form of a cuirass enclosing the chest only and having seals in accordance with the invention at the neck and just below the diaphragm.

FIGURE 10 shows, by way of contrast, an "iron-lung" respirator 26 of known type comprising a box-like structure 27 defining the fluid chamber and having at one end a removable collar 28 lined with soft sponge-rubber (not shown) which sealingly cooperates with the neck of a patient and which is clamped in use between an upwardly slidable end wall 29 and a fixed end wall 30, the slidable end wall being held down by a clamping rod 31 pivoted at 32. The collar 28 is formed in two more or less semi-circular halves so that it can be disposed around, or removed from the patient's neck quickly. It will be appreciated that collar 28 can only seal with the patient's neck if it fits fairly tightly, and this leads to chafing of the skin of the throat and restricts any movement of the patient's head and/or body.

FIGURE 11 shows an "iron-lung" respirator 33 which has been adapted from the respirator 26 of FIGURE 10 to incorporate a seal in accordance with the invention, such as the seal 19 described in relation to FIGURES 6 to 8. The internal diameter of the ring 14 of the seal 19 is one to three inches greater than the expected average neck diameter of patients and each of the closure members 10, 110 hereof extend inwardly from the ring 14 a distance of 1½ to 3 inches, leaving a circular gap between the innermost tips of the closure members 10, 110 which will be closed in operation by the cooperation of the closure members 10, 110 against the patient's neck. The ring 14 can be split across a horizontal diameter $d$, into two co-operable semi-circular portions to which the closure members 10, 110 are attached so that the patient's neck can be disposed in the seal 19 without the necessity, as in the embodiment of FIGURE 9, to push the patient's head through the seal 19. The patient is arranged in the respirator 33 in the same manner as in the respirator 26 of FIGURE 10. It will be appreciated that the previously known respirator 26 may be easily adapted to the form of the respirator 33 merely by enlarging the semi-circular recesses provided in the end walls 29 and 30 and by replacing the collar 28 by the seal 19. The closure members 10, 110 of the seal 19 sealingly cooperate with the patient's neck without tightly gripping the neck: accordingly, the patient is free to move his head and body to a limited extent, and chafing of the skin is reduced or eliminated. It will also be appreciated that the respirator 20 of FIGURE 9 may be fitted with a seal 19 of the type described in relation to FIGURE 11, instead of the unitary seal 19 described in relation to FIGURE 6.

FIGURE 12 shows a developed view of an arrangement of the closure members 10, 110 of another form of seal 34 in accordance with the invention and which is capable of resisting pressure differences which act in either direction across the seal 34. The closure members 10, 110 may be similar to the closure members 10, 110 of FIGURES 6 to 8 or to the closure members 18 of FIGURE 4. The arrangement of the closure members 10, 110 is similar to the arrangement of FIGURES 6 to 8 except that each closure member 10 embraces the adjacent restraining ties 12 of successive oppositely facing closure members 110 between its own restraining ties 12. When the pressure on the right hand side of the seal 34 (as seen in FIGURE 12) is greater than the pressure on the left hand side, the closure members 10 are inflated and the restraining ties 12 of each closure member 10 are urged by the pressure of the gas away from each other and into sealing cooperation with the adjacent restraining ties 12 of neighbouring closure members 10: the closure members 110 are more or less unaffected by a differential pressure acting in this sense. If the direction of the differential pressure across the seal 34 is reversed, the closure members 110 become inflated as shown in FIGURE 13 and their restraining ties 12 are urged into sealing contact with each other. The closure members 10 tend to hang limply since they will not be substantially affected by a differential pressure acting from left to right as viewed in FIGURE 13. As the seal 34 can resist pressure differences acting across it in either direction, it may be incorporated in the respirators 20 of FIGURE 9 and 33 of FIGURE 11 in place of the seal 19.

FIGURE 14 is a developed view of yet another form of seal capable of resisting alternately-acting oppositely-directed pressure forces, in which the closure members 10 completely embrace the closure members 110 so as to form in effect, a bag. The closure members 10, 110 may take any of the previously described forms. When the pressure to the left (as seen in FIGURE 14) of the seal exceeds the pressure to the right of the seal, the closure members 10 are inflated and neighbouring restraining ties 12 of adjacent closure members 10 abut each other and substantially prevent leakage between the adjacent closure members 10. The closure members 110 are not inflated and take up a configuration determined by their weight and stiffness. When the pressure to the right of the seal exceeds the pressure to the left of the seal, initially there is a leakage across the seal from right to left. This leakage inflates the closure members 110 and the restraining ties 112 of each closure member 110 are separated and urged into abutment with the embracing restraining ties 12 of the corresponding closure member 10: thus the restraining ties 12 of each closure member 10 are outwardly urged into abutment with the neighbouring restraining ties 12 of the adjacent closure members 10 so as once again to close any gap therebetween and substantially prevent leakage through the seal.

FIGURE 16 shows another form of closure member 210 which can be incorporated in a seal in accordance with the invention. The closure member 210 comprises a flexible conical bag 40 formed from flexible sheet material such as nylon or rubberised fabric. The pointed end of the conical bag 40 may be closed or open so long as it cooperates in operation, either with the pointed ends of other conical bags or with an object which extends through the seal. The other outer end 41 of the conical bag 40 is attached, e.g. by adhesive, to the inside of a ring (not shown) corresponding with the ring 14 of previous seals 19. The manner of attachment is arranged to be such that the bag 40 is flattened to give the bag 40 a substantially elliptical cross-sectional shape in cross-sections transverse to a radius from the centre of the ring. The bag 40 has apertures 42, 43 at each end of its major axis, near to its outer end 41 and flaps 44, 45 of thin impermeable fabric (such as rubber sheet or rubberised fabric.) The flaps 44, 45 are normally inwardly curved away from the apertures 42, 43 so that the apertures provide communication between the interior and the outside of the conical bag 40. The flaps 44, 45 are urged into contact with the parts of the bag 40 defining the respective apertures 42, 43 when the pressure inside the conical bag 40 exceeds the pressure outwardly of the corresponding aperture 42, 43. Thus, if the pressure to the left of the closure member 210 (as seen in FIGURE 16) exceeds the pressure to the right of the closure member 210, flap 44 will open when the pressure within conical bag 40 substantially equals the pressure to the left (which it will in a short time) and flap 45 will be urged rightwardly to close aperture 43.

FIGURE 17 shows a developed view of a number of the closure members 210 of FIGURE 16 arranged side-by-side to form a seal, generally designated by 46. The closure members 210 may be attached by their outer ends 41 to the periphery of an aperture defined by, for example, the ring 14 of FIGURE 3 or the rectangular member 16 of FIGURE 4, so that they extend across the aperture towards closure members on an opposite portion of the periphery of the aperture. In FIGURE 17, the pressure to the right of the seal 46 exceeds the pressure to the left, and the flap 44 closes aperture 42 while aperture 43 remains unobstructed. The conical bags 40 of the closure member 210 are inflated into sealing cooperation with each other, and are at the same pressure as the pressure to the right of the seal. FIGURE 18 shows the seal 46 of FIGURE 16 but with a pressure to the left exceeding the pressure to the right of seal 46. The flap 45 now closes aperture 43 while aperture 42 is unobstructed by flap 44. Thus the conical bags 40 will now be inflated to the same pressure as the pressure to the left of the seal 46 and sealingly cooperate with each other. The seal 46 is thus effective whichever direction the pressure difference across it is acting, and may be usefully employed as a neck seal in an "iron lung" respirator. When the pressures on each side of the seal 46 are equal, the conical bags 40 will not be inflated into sealing cooperation with each other, but since there is then no pressure difference across the seal 46 to resist, this does not matter.

FIGURE 19 shows a sleeve 50 having a seal 51 in accordance with the invention and which can confine an object or part thereof under a controlled atmosphere. In this case, part of an arm is confined in a pressurized atmosphere of oxygen-enriched, sterilized and humidified air fed to the interior of sleeve 50 by way of connection 52. It has been observed that burned or lacerated tissue seems to benefit therapeutically from being confined in this way. The seal 51 can take any of the forms previously described. There may be another seal 51, not visible, at the other end of sleeve 50. In a modification (not shown), the sleeve 50 may also have an outlet connection enabling the pressurized air from connection 52 to flow continuously over the arm (or other object). It is thought that therapeutic benefits are derived from exposing burned or lacerated tissue to a continuous flow of pressurized air.

FIGURE 20 illustrates another form of seal 60 in accordance with the invention in which some, or all, of the closure members 310 are formed from a single strip of relatively impervious flexible sheet material which has been looped alternatively under a number of rods 61 projecting away from the inner periphery of the apertured member 62 which is to be sealed, and over a number of retaining blocks 63 projecting from the inner periphery of the apertured member 62 above each pair of rods 61. The retaining blocks 63 has a suitably curved upper (as seen in FIGURE 20) surface which imparts the desired contour to the closure portions 311 of the closure members 310; the curved upper surface of the retaining blocks 63 is substantially parallel to the axis of the most adjacent rods 61 in common planes parallel to the axis of the aperture to avoid buckling of the material of the closure members 310. The width of the strip material may exceed the distance that the rods 61 project so that access through the seal 60 is easily available. If the rods 61 extend perpendicularly from the periphery of the apertured member 62, the closure portions 311 of the closure members 310 will also project perpendicularly from the periphery of the apertured member and the closure portions 311 will cooperate to seal the aperture substantially in one plane. The rods 61, and the curved upper surfaces of the retaining blocks 63 need not project perpendicularly from the inner periphery of the apertured member 62, but may for instance, have a downward inclination, (relative to the view of FIGURE 20) so that the closure portions 311 of the closure members 310 downwardly incline toward the closure portions 311 of closure members 310 projecting from the opposite side of the inner periphery of the apertured member 62. It is thought that with this downward inclination, the rods 61 will not restrict the useful maximum area of the seal to such an extent as when there is no such inclination. When the pressure below (relative to the view of FIGURE 20) the seal 60 exceeds the pressure above the seal 60, each of the closure members 310 is inflated and its restraining ties 312 provided by the material between the rods 61 and the retaining blocks 63 are separated and urged into sealing abutment with the restraining ties 312 of the neighbouring closure members 310 substantially to prevent any leakage between the closure members 310. The closure portions 311 are upwardly inflated and extend across the aperture in the same manner as described in relation to the seals of previous embodiments.

The preferred use of this type of seal 310 is for a pressure difference acting in one direction all the time, but it is thought that the seal 310 might find some application with alternately-acting oppositely-directed pressure differences in embodiments where the rods 61 and the curved surfaces of the retaining blocks 63 extend substantially perpendicularly away from the inner periphery of the apertured member 62.

Seals in accordance with the invention may be employed in ways other than those suggested above. For example, they may be used to close apertures in chambers in which biological or radio-active specimens are to be isolated and to which ready access is desired: the seals will permit a hand or pair of tongs to enter the chamber through the seal while avoiding substantial increases in the leakage from the chamber. They may also be used in maintaining the pressure of pressure resisting suits (e.g. high altitude suits or divers suits), and in place of the airlocks used for maintaining the high pressure in mines and tunnels. In the latter application, a number of seals in accordance with the invention may be arranged in series to resist higher pressures.

It is to be understood that the invention is not confined only to the forms of seal described above, and that various combinations of the features of the various seals can be employed without thereby departing from the invention.

We claim:

1. A pressure resisting seal comprising means defining an aperture, and a plurality of inflatable flexible sheet closure members attached side-by-side around the periphery of the aperture, each of which, under the influence of pressurised fluid confined on one side of the seal, during operation, is inflatable so as to substantially seal against peripherally adjacent closure members and extends towards closure members extending from an opposite portion of the periphery of the aperture, whereby to close at least part of the aperture.

2. A seal according to claim 1 in which each closure member comprises a closure portion which, in operation, extends across the aperture under the influence of the pressurised fluid, and means extending substantially normal to the closure portion for restraining the closure portion against the pressure of the fluid, whereby the closure portion forms a boundary for the fluid.

3. A pressure resisting seal comprising means defining an aperture, and a plurality of flexible sheet closure members attached side-by-side around the periphery of the aperture, each of which, under the influence of pressurised fluid confined on one side of the seal, during operation, cooperates with and substantially seals against peripherally adjacent closure members and extends towards closure members extending from an opposite portion of the periphery of the aperture, whereby to close at least part of the aperture, each closure member comprising a closure portion which, in operation, extends across the aperture under the influence of the pressurised fluid, and means for restraining the closure portion against the pressure of the fluid, whereby the closure portion forms a boundary for the fluid, each closure portion having opposite edge regions which, in operation, extends inwardly from the periphery of the aperture, and the restraining means comprising a pair of cheek portions which connect the opposite edge regions with the periphery of the aperture, the adjacent cheek portions of neighbouring closure members being inflated into substantial sealing cooperation with each other, during operation, under the influence of the pressurised fluid.

4. A seal according to claim 3 in which each cheek portion is of substantially isosceles right-angled triangular form and arranged with its hypotenuse edge region contiguous with the periphery of the aperture, and with one of its other two edge regions connected to one of the said edge regions of the closure portion whereby, in operation, the closure portion is maintained at an angle of substantially 45° to the plane of the aperture against the influence of the pressurised fluid.

5. A seal according to claim 3 in which each closure portion and the associated pair of cheek portions are formed from a common piece of flexible sheet material.

6. A seal according to claim 3 in which the cheek portions of alternate closure members extend away from the edge regions of the corresponding closure portions in opposite directions.

7. A seal according to claim 6 in which each closure member is disposed generally between the peripherally adjacent closure members.

8. A seal according to claim 6 in which each cheek portion of one closure member is disposed between the cheek portions of one of the peripherally adjacent closure member.

9. A seal according to claim 6 in which the closure members are arranged in pairs with the cheek portions of one closure member of a pair embraced by the cheek portions of the other closure member of the pair.

10. A seal according to claim 6 in which the closure members are arranged in pairs and each pairs of closure members has cheek portions in common, there being valve means in each closure portion arranged to permit pressurised fluid to pass through the closure portions to the space between the cheek portions, but substantially not in the other direction.

11. A seal according to claim 7 in which alternate closure members have common cheek members.

12. A seal according to claim 11 in which the closure members are formed from a single strip of flexible sheet material.

13. A seal according to claim 2 in which the aperture is substantially circular in shape and each closure portion is substantially triangular in shape.

14. A seal according to claim 2 in which each closure portion is substantially trapezium shaped.

15. A seal according to claim 1 in which the aperture-defining means comprising at least two separate parts to which the closure members are connected, the parts being separable in direction normal to the axis of the aperture, whereby an object having dimensions exceeding the dimensions of the aperture may be passed between said two parts.

16. A pressure-tight enclosure comprising a pressure-resisting seal in accordance with claim 1.

17. A respirator comprising a seal in accordance with claim 1 adapted for sealing cooperation with the neck of a patient, and a wall for surrounding at least the patient's chest.

18. A respirator according to claim 17 in which the said wall is of flexible sheet material.

19. A respirator according to claim 18 comprising a frame disposed within the wall for supporting the wall against the pressure outside the wall.

References Cited

UNITED STATES PATENTS 2,695,608  11/1954  Gibbon _____ 220—24
2,803,370  8/1957  Lennard.

JAMES B. MARBERT, *Primary Examiner.*

U.S. Cl. X.R.

220—24